Figure 1:
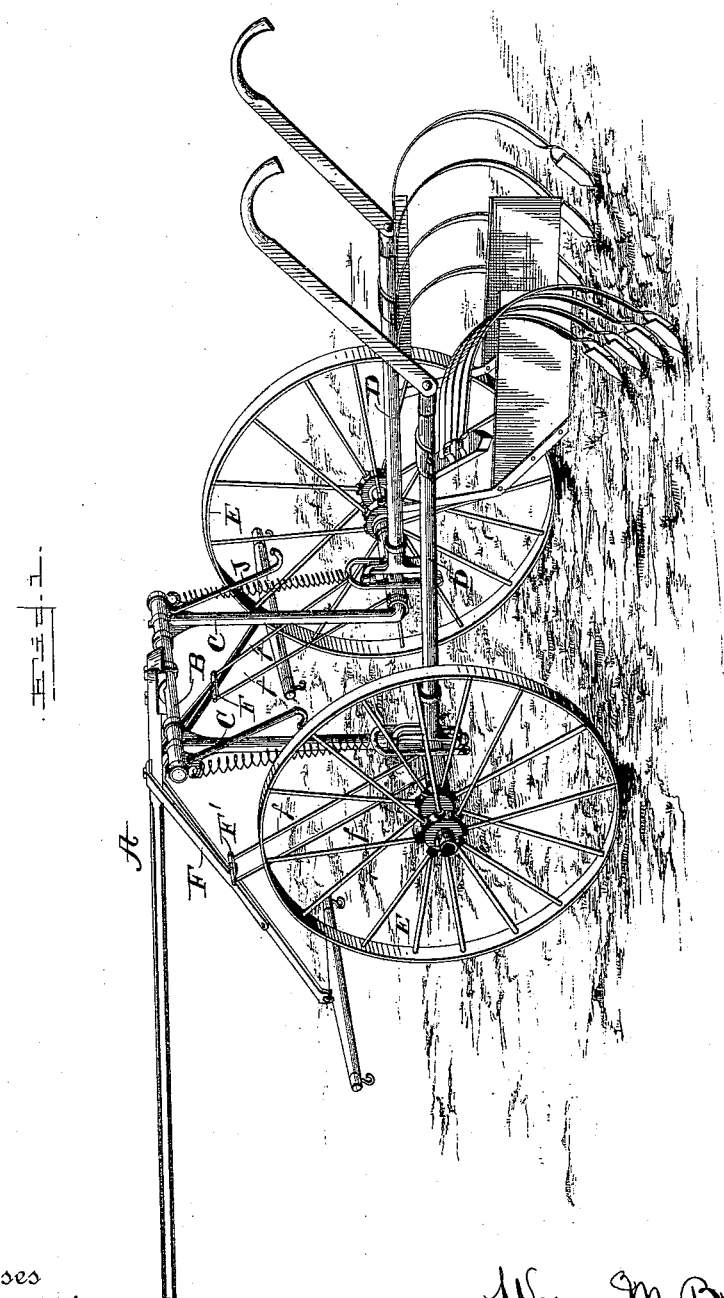

(No Model.) 4 Sheets—Sheet 1.
W. M. BRINKERHOFF, A. W. STEVENS & L. D. SWART.
CULTIVATOR.

No. 447,443. Patented Mar. 3, 1891.

Witnesses
W. H. Pumphrey
G. A. Tauberschmidt

Inventors
Warren M. Brinkerhoff
Abram W. Stevens and
Lester D. Swart
By their Attorneys
Whitaker & Prevost (No Model.) 4 Sheets—Sheet 2.
W. M. BRINKERHOFF, A. W. STEVENS & L. D. SWART.
CULTIVATOR.
No. 447,443. Patented Mar. 3, 1891.
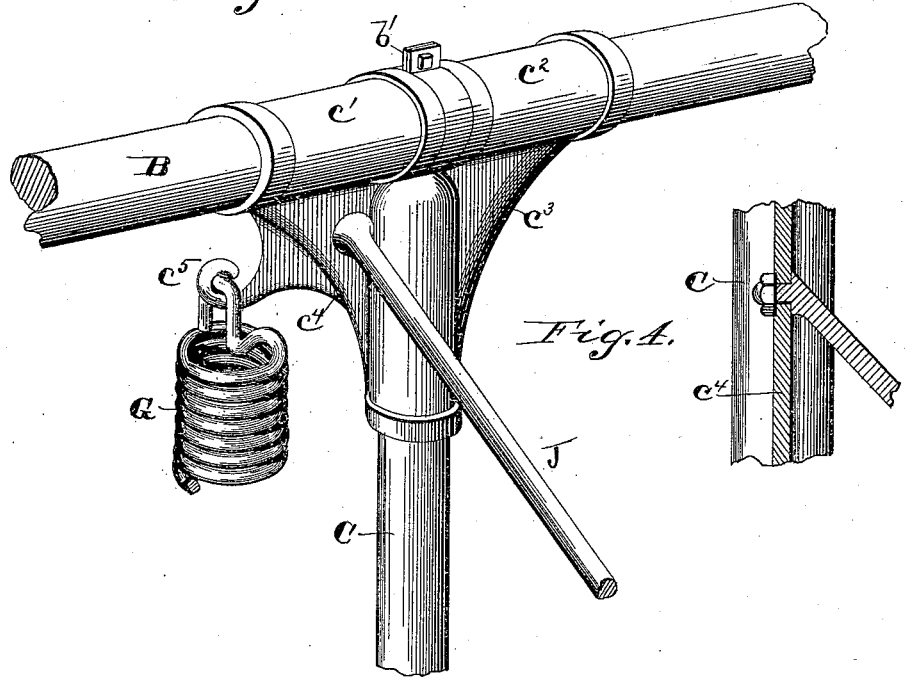
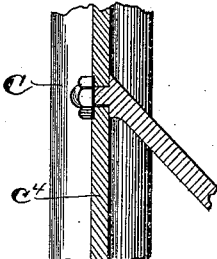
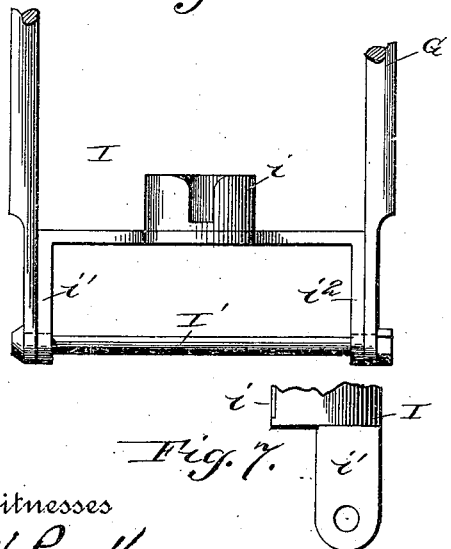
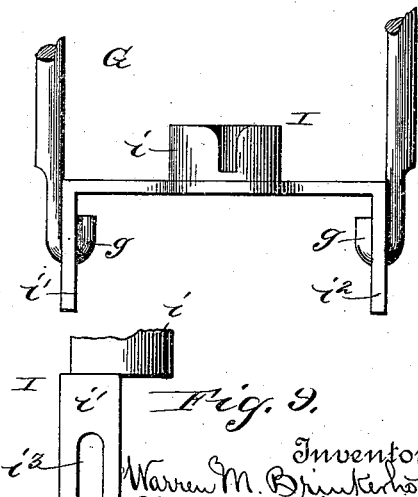
Witnesses
W. H. Pumphrey
G. A. Taubenschmidt
Inventors
Warren M. Brinkerhoff
Abram W. Stevens
Lester D. Swart
By their Attorneys
Whitaker & Prevost.
THE NORRIS PETERS CO., PHOTO-LITHO., WASHINGTON, D. C.

(No Model.) 4 Sheets—Sheet 3.
W. M. BRINKERHOFF, A. W. STEVENS & L. D. SWART.
CULTIVATOR.
No. 447,443. Patented Mar. 3, 1891.
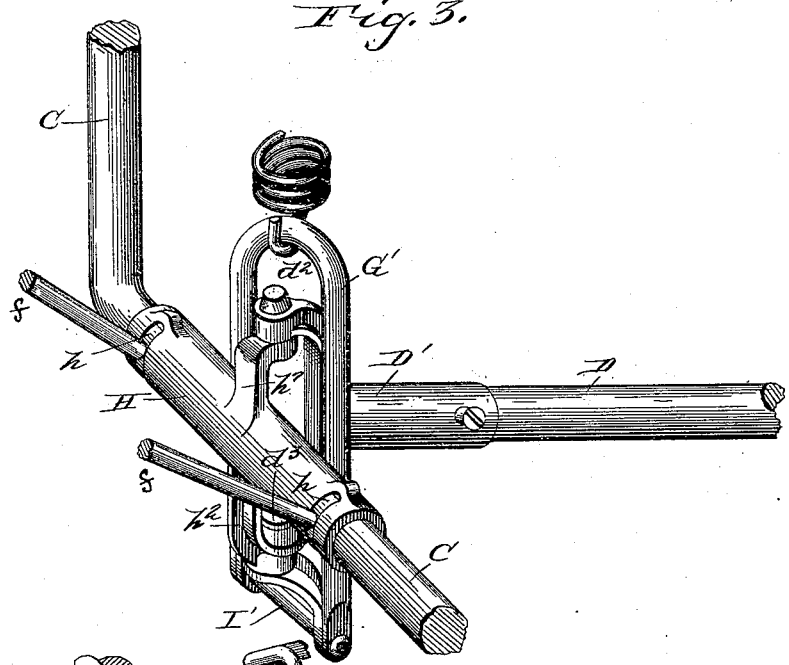
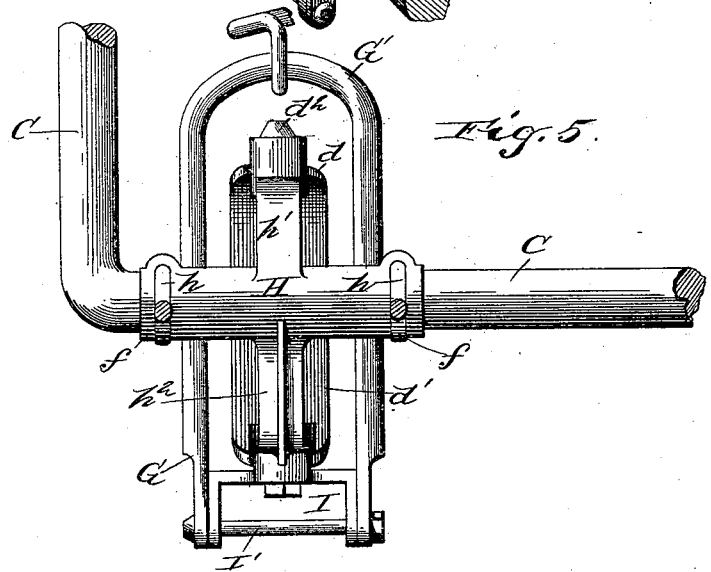

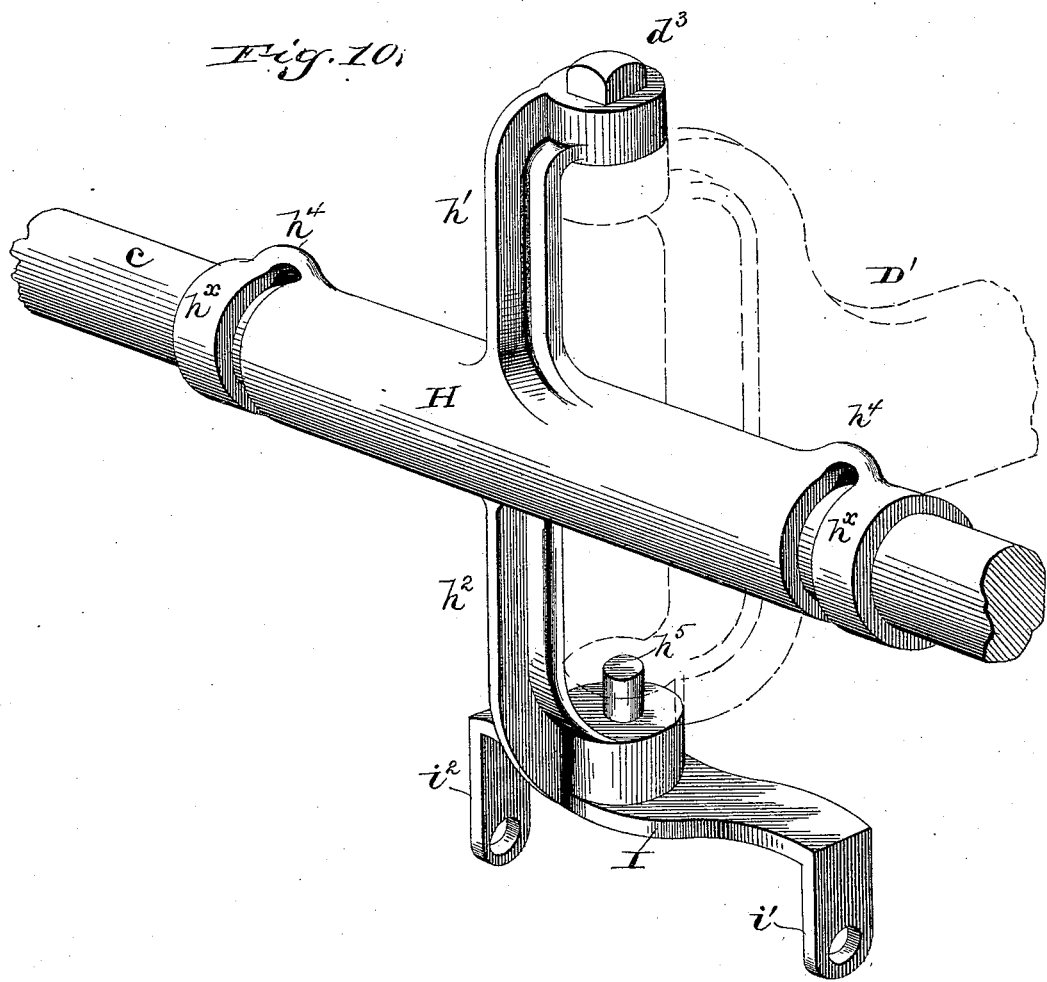

UNITED STATES PATENT OFFICE.

WARREN M. BRINKERHOFF, ABRAM W. STEVENS, AND LESTER D. SWART, OF AUBURN, NEW YORK.

CULTIVATOR.

SPECIFICATION forming part of Letters Patent No. 447,443, dated March 3, 1891.

Application filed September 18, 1890. Serial No. 365,424. (No model.)

*To all whom it may concern:*

Be it known that we, WARREN M. BRINKERHOFF, ABRAM W. STEVENS, and LESTER D. SWART, citizens of the United States, residing at Auburn, in the county of Cayuga and State of New York, have invented certain new and useful Improvements in Cultivators; and we do hereby declare the following to be a full, clear, and exact description of the invention, such as will enable others skilled in the art to which it appertains to make and use the same.

Our invention relates to the class of cultivators; and it consists in certain improvements in a cultivator of the class known as "straddle-row" cultivators, or those which are constructed to cultivate the spaces between three rows of rowed crops or on each side of a single row of the same, and more particularly those cultivators of that class in which the separate gangs of plows or cultivator-teeth have a longitudinal movement independently of each other.

In the drawings we have illustrated the best form in which we have contemplated embodying our invention, and said invention is fully disclosed in the following specification and claims.

In the said drawings, Figure 1 is a perspective view of our improved cultivator. Fig. 2 is a perspective view of the upper end of the pivoted standard at the left side of the cultivator, and Fig. 3 is a like view of the lower end of the same, parts being broken away. Fig. 4 is a partial section showing the manner of attaching the supports for the plow or cultivator beams when raised out of operative position. Fig. 5 is a front view of the parts shown in Fig. 3. Figs. 6 and 7 are details of construction of a portion of said parts. Figs. 8 and 9 are views of a modified form of such parts, and Fig. 10 is a perspective of another modification of such devices.

In the figures, A is a pole or tongue, and B is a cross bar or rod rigidly secured to the same at right angles thereto. To each end of this cross-bar is pivotally secured the upper end of a standard C. The lower ends of the standards C are each provided with an outwardly-extending horizontal arm $c$, which may be termed the "axle-arm," as each of said arms forms an axle for one of the supporting-wheels E. Each wheel and standard is permitted a considerable measure of movement in the line of draft independently of the other at the opposite side of the implement through the following instrumentalities: Each standard is at its upper end provided with a sleeve rigidly connected therewith. This sleeve is divided into two sections $c'$ $c^2$, and when placed upon the cross-bar B is capable of turning thereon as a pivot or axis, but is held from movement longitudinally of said bar by a divided collar or clip $b$, inclosing the cross-bar B between the parts $c'$ $c^2$ of the sleeve and rigidly clamped to the bar by a bolt $b^3$ passing through the ears $b'$ $b^2$ of the clip. The sleeve at the point of its connection to the standard is additionally secured and braced by flanges or webs $c^3$ $c^4$. The outer web on each side is provided with a hook $c^5$, to which is attached the upper end of a spring G. Each axle-arm is connected with the draft-evener, so as to move therewith independently of the other, and in this instance we show the following construction for that purpose: Upon each axle-arm $c$, between the wheel E and the lower end of the standard C, is fitted a sleeve H, movable on the axle-arm and forming a hollow rock-shaft. Near each end this sleeve is provided with transverse slots $h$ $h$, the opposite ends of which slots are connected by a channel extending around on the inside of the sleeve. Two draft-rods $f f$ have their rear ends formed with hooks or loops which lie in the said channel and directly engage the axle-arm, the said rods passing forward out through the said slots. The forward ends of these rods $f f$ are pivotally connected with a short evening-bar F', which has a central pivotal connection with the draft-evener F. The slots $h$ $h$ permit the hollow rock-shaft H to turn or rotate a limited distance upon the axle-arm $c$, and the rods $f f$ also turn upon the axle-arm as far as necessary to permit the longitudinal movement of the pivoted standard and the cultivator or gang connected therewith; but these features of construction are not herein claimed, as they form no part of our joint invention.

The gang cultivator-beam is pivoted to the hollow rock-shaft H by means of the ears $h'$ $h^2$, projecting from said sleeve or shaft and having openings in their ends. Each beam D is provided with a head D', which has ears $d\ d'$ connected therewith, and these ears are provided with openings, which, when caused to register with the openings in the ears $h'$ $h^2$, are secured thereto by bolts $d^2\ d^3$ in a well-known way. These bolts form the pivots or centers upon which the gang or cultivator-beam can turn to afford the cultivator movements in a horizontal plane, while the turning of the hollow rock-shaft H upon the axle-arm $c$ of the standard permits the adequate vertical movement of the beam D and cultivator.

The springs G hereinbefore referred to are employed to assist the operator in raising the beams and plows or cultivators. The upper end of each spring is secured as hereinbefore stated. The lower end is secured to the loop or stirrup G'. The sides of the stirrup G' extend downward on each side of the head of the beam D and are connected at their lower ends with the downwardly-projecting ends of a yoke I, which has a fixed relation to the vertical pivotal point of the beam D. The yoke I is preferably given one of the forms shown in Figs. 6, 8, and 10. In the first two of these figures the upper side of the yoke is provided with a socket $i$, adapted to engage the ear $h^2$ and the pivot-bolt $d^3$, the rear side of the socket being provided with a notch or recess to receive the strengthening-web of the ear $h^2$ of the sleeve H. In the form shown in Fig. 6 the outer ends of the yoke are provided with the downwardly-extending projections or ears $i'\ i^2$, which are provided with apertures. The downwardly-extending sides of the stirrup G' are provided with similar apertures, and the two are connected together by a bolt I'.

In Fig. 8 the downwardly-extending sides of the stirrup G' are provided with inwardly-turned hooks $g\ g$, and the ears $i'\ i^2$ of the yoke I are provided with slots $i^3$, as shown in Fig. 9, to engage the said hooks.

In Fig. 10 the yoke I is made a part of or is rigidly secured to the ear $h^2$ of the hollow rock-shaft H and has ears depending from its ends provided with apertures to receive the bolt I' or with slots to engage the hooks $g\ g$ of the stirrup G'. In this case the ear $h^2$ is provided with the rigid pintle $h^5$, which serves as a pivot for the beam D in lieu of the bolt $d^3$.

It is to be noted that the spring is expanded and exerts the greatest force when the beam is in its lowest or operative position, and that the force exerted thereby decreases as the beam is raised from this position.

In order to provide a means for holding the beams D and their connected parts when raised out of operative position, which shall always engage the beam in the same manner no matter what its position relative to the cross-bar B may be, we attach supports J J for this purpose to the webs $c^4$ of the pivoted standards, as shown in Figs. 2 and 4.

We prefer to attach a gang or set of spring cultivator-teeth to each beam D, as shown; but any other forms of cultivating devices may be employed in lieu thereof.

What we claim, and desire to secure by Letters Patent, is—

1. In a cultivator having gangs or cultivators free to move longitudinally independently of each other, the combination, with a pivoted standard having an axle-arm at its lower end and a cultivator-beam pivotally connected therewith, of a lifting spring connected at its upper end with said standard and its lower end connected for lifting said beam, the point at which the upward pressure of the spring is applied being below the longitudinal center of the said beam, substantially as described.

2. In a cultivator, the combination, with the cross-bar, the standards having divided tubular portions engaging said cross-bar, and the strengthening-web connecting said parts to the standard, of the divided clamping-collar for engaging said cross-bar and securing and adjusting said standards with respect thereto, said collar having perforated ears and a bolt engaging said ears, substantially as described.

3. In a cultivator, the combination, with the pivoted beam, of a lifting-spring and a stirrup having its lower ends provided with an inwardly-turned hook adapted to engage recessed parts connected for vertical movement with said beam, substantially as described.

In testimony whereof we hereby affix our signatures in presence of two witnesses.

WARREN M. BRINKERHOFF.
ABRAM W. STEVENS.
LESTER D. SWART.

Witnesses to signature of Warren M. Brinkerhoff:
L. P. WHITAKER,
O. D. BAKER.

Witnesses to signatures of Abram W. Stevens and Lester D. Swart:
L. W. STEVENS,
CHAS. B. QUICK.